US011616247B2

(12) United States Patent
Garsany et al.

(10) Patent No.: US 11,616,247 B2
(45) Date of Patent: Mar. 28, 2023

(54) MULTI-INTERFACE MEMBRANE ELECTRODE ASSEMBLY

(71) Applicant: The Government of the United States of America, as represented by the Secretary of the Navy, Arlington, VA (US)

(72) Inventors: Yannick Garsany, Severna Park, MD (US); Robert Atkinson, III, Winchester, MA (US); Benjamin Gould, Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/349,464

(22) Filed: Jun. 16, 2021

(65) Prior Publication Data
US 2021/0391589 A1 Dec. 16, 2021

Related U.S. Application Data

(60) Provisional application No. 63/039,762, filed on Jun. 16, 2020.

(51) Int. Cl.
*H01M 4/92* (2006.01)
*H01M 8/1004* (2016.01)
*H01M 4/86* (2006.01)

(52) U.S. Cl.
CPC ....... *H01M 8/1004* (2013.01); *H01M 4/8605* (2013.01); *H01M 4/926* (2013.01)

(58) Field of Classification Search
CPC ... H01M 8/1004; H01M 4/8605; H01M 4/926
See application file for complete search history.

(56) References Cited

U.S. PATENT DOCUMENTS

| 7,419,740 | B2 | 9/2008 | Binder et al. |
| 10,205,173 | B2 | 2/2019 | Young et al. |
| 2006/0002844 | A1* | 1/2006 | Suenaga ............ H01M 4/8652 423/447.3 |
| 2006/0057281 | A1* | 3/2006 | Izumi ..................... H01M 4/92 429/535 |

(Continued)

FOREIGN PATENT DOCUMENTS

| CN | 108063267 | * | 6/2020 |
| CN | 108063267 B | | 6/2020 |

OTHER PUBLICATIONS

CN 108063267 MT (Year: 2020).*

(Continued)

*Primary Examiner* — Alexander Usyatinsky
(74) *Attorney, Agent, or Firm* — US Naval Research Laboratory; Joseph T. Grunkemeyer (57) ABSTRACT

A fuel cell membrane electrode assembly having: a proton exchange membrane, an anode catalyst coating on one side of the membrane, and a cathode catalyst coating on the other side of the membrane. The cathode catalyst coating has at least two carbon catalyst layers, with a low porosity layer adjacent to a high porosity layer. The high porosity layers have a volume fraction that is higher than the volume fraction of the low porosity layers.

17 Claims, 13 Drawing Sheets

(56) References Cited

U.S. PATENT DOCUMENTS

| | | | | |
|---|---|---|---|---|
| 2006/0188779 A1* | 8/2006 | Yoppolo | ............ | H01M 50/182 |
| | | | | 429/174 |
| 2008/0261103 A1* | 10/2008 | Ueda | .................. | H01M 8/1011 |
| | | | | 429/480 |
| 2010/0261089 A1* | 10/2010 | Morioka | .............. | H01M 4/926 |
| | | | | 429/481 |
| 2011/0008705 A1* | 1/2011 | Zheng | .................... | B82Y 30/00 |
| | | | | 429/480 |

OTHER PUBLICATIONS

Soboleva et. al. ACS Appl. Mater. Interfaces 2011, 3, 1827-1837 (Year: 2011).*

Eikerling, "Water Management in Cathode Catalyst Layers of PEM Fuel Cells" J. Electrochem. Soc., 153(3) E58-E70 (2006).

Garsany et al., "Improving PEMFC Performance Using Short-Side-Chain Low-Equivalent-Weight PFSA Ionomer in the Cathode Catalyst Layer" J. Electrochem. Soc., 165(5) F381-F391 (2018).

Garsany et al., "High power, Low-Pt membrane electrode assemblies for proton exchange membrane fuel cells" J. Power Sources, 408 (2018) 38-45.

Garsany et al., "Effect of GDM Pairing on PEMFC Performance in Flow-Through and Dead-Ended Anode Mode" Molecules 2020, 25, 1469.

Sassin et al., "Understanding the interplay between cathode catalyst layer porosity and thickness on transport limitations en route to high-performance PEMFCs" Int. J. Hydrogen Energy 44 (2019) 16944-16955.

Sassin et al., "Fabrication Method for Laboratory-Scale High-Performance Membrane Electrode Assemblies for Fuel Cells" Anal. Chem., 2017, 89, 511-518.

Search Report and Written Opinion in PCT/US2021/037640 (dated Oct. 7, 2021).

Soboleva et al., "PEMFC catalyst layers: The role of micropores and mesopores on water sorption and fuel cell activity", ACS Appl. Mater. Interfaces 2011, 3, 1827-1837.

Jung et al., "Three-dimensional reconstruction of coarse-dense dual catalyst layer for proton exchange membrane fuel cells", Electrochimica Acta 211 (2016) 142-147.

Yu et al., "Improving the performance of a PEMFC with Ketjenblack EC-600JD carbon black as the material of the microporous layer", Electrochemical and Solid-State Letters, 8(6) A320-A323 (2005).

* cited by examiner

MULTI-INTERFACE MEMBRANE ELECTRODE ASSEMBLY

This application claims the benefit of U.S. Provisional Application No. 63/039,762, filed on Jun. 16, 2020. The provisional application and all other publications and patent documents referred to throughout this nonprovisional application are incorporated herein by reference.

TECHNICAL FIELD

The present disclosure is generally related to fuel cell membrane electrode assemblies (MEA).

DESCRIPTION OF RELATED ART

Figure 1:
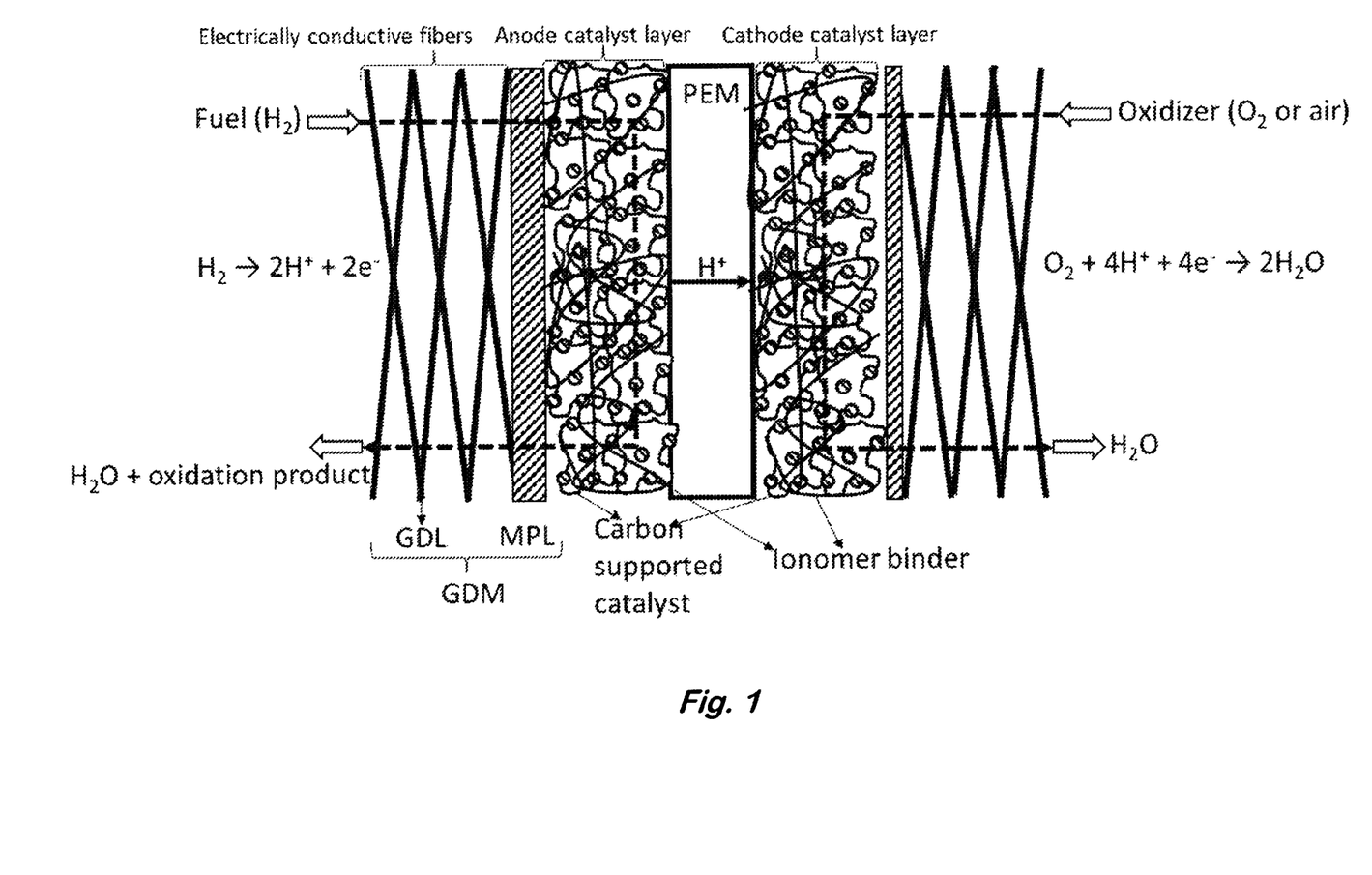
FIG. 1 shows a schematic structure of a PEMFC membrane electrode assembly (MEA).
Figure 2:
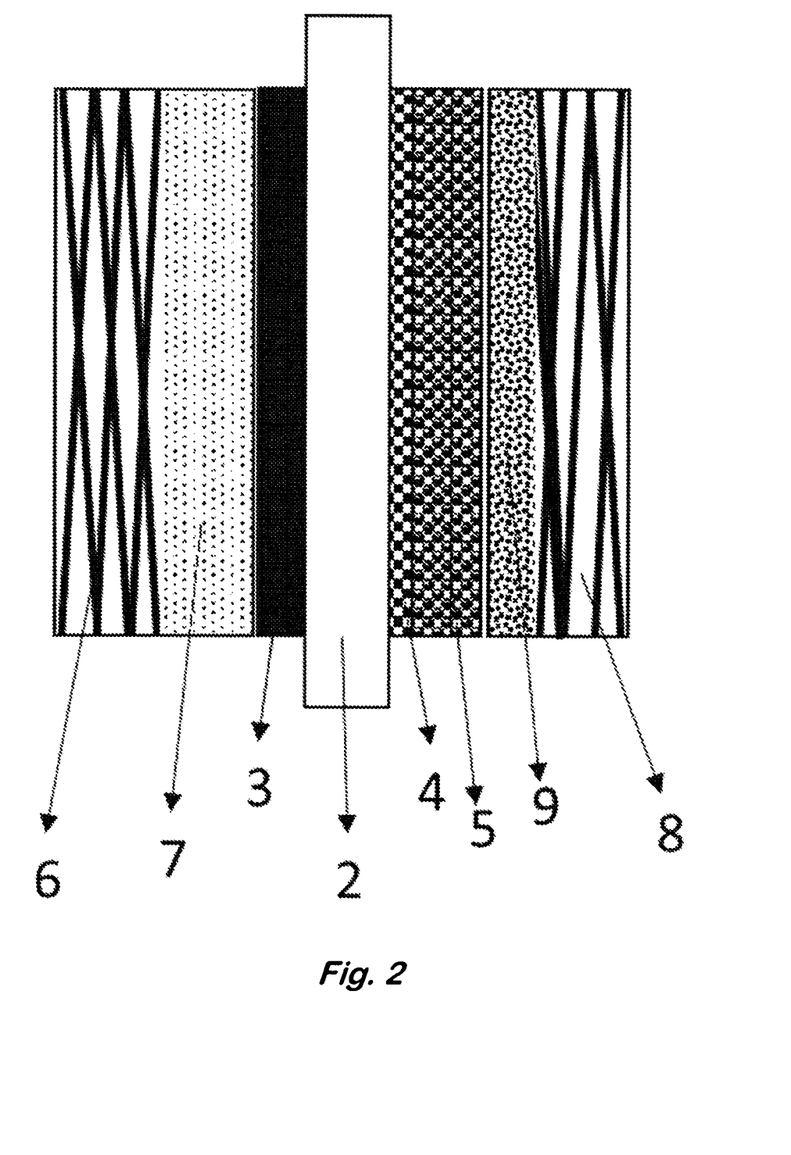
FIG. 2 shows an embodiment of an MEA with two cathode catalyst layers.

A proton exchange membrane fuel cell (PEMFC) is thoroughly described in the prior art as an electrochemical device that converts a fuel and an oxidizing agent into electricity, heat and water at two spatially and electronically separated electrodes. Typically, hydrogen gas is used as the fuel and oxygen (typically from air) as the oxidizing agent. At the heart of the PEMFC is the MEA. The MEA has a sandwich-like structure and generally comprises five layers. A schematic structure of a five-layer MEA is shown in FIG. 1. As illustrated in FIG. 1, a MEA is generally formed of a proton exchange membrane (PEM) in contact with catalyst layers on each side, which catalyze the electrochemical reactions. One of the catalyst layers forms the anode, and the other catalyst layer forms the cathode of the MEA. To complete the five-layer MEA with the catalyst coated membrane (CCM), there is a gas diffusion medium (GDM) at each the anode and cathode, which regulates gas and water transport, conducts heat and electricity, and mechanically supports the CCM. At the anode, the anode catalyst oxidizes the hydrogen molecule ($H_2$) to split it into protons ($H^+$) and electrons ($e^-$). The protons pass through the membrane to the cathode while the electrons travel through an external circuit to the cathode, resulting in the production of electricity. At the cathode, the electrode catalyzes the reaction of oxygen molecules with the protons that have travelled through the membrane and the electrons from the anode to form product water, which is removed from the system. One of the challenges for high PEMFC power production is the simultaneous requirement of rapid ingress of the respective reactant gases (hydrogen and oxygen) and egress of product water from the cathode.

The anode and the cathode catalyst layers each contain electrocatalysts, which catalyze the respective reaction. Typically, nano-sized platinum (i.e. 1 to 10 nm) group metal catalysts that have been fixed to the surface of a conductive support material are used. Carbon blacks with particle sizes of 2 to 100 nm and high electronic conductivity and surface area are used as support materials. The catalyst layer also contains an ionomer binder such as Nafion®. Gas diffusion media (GDM) are placed on the anode and cathode catalyst layers to facilitate reactant gas (hydrogen and oxygen) distribution, to conduct heat from the catalyst layers, and to establish electrical contact. GDM typically consist of porous carbon matrices (cloths, papers, or nonwovens) and are comprised by two regions. The fibrous gas diffusion layer (GDL) substrate has larger pores or voids and serves as a relatively robust substrate that gives the MEA its mechanical integrity. The GDL is comprised of fibrous carbon and is commonly treated with fluoropolymers (i.e. PTFE) for hydrophobicity. A carbon particle-based, hydrophobic, microporous layer (MPL) is coated on the GDL to improve thermal and electrical contact with the catalyst layers, and maintain a certain humidification level of the adjacent catalysts layers and the PEM while avoiding flooding of the electrodes, which would compromise the reactant gas supply to the catalyst layers.

In order to improve the performance of PEMFCs, a variety of manufacturing methods are conventionally investigated to prepare MEAs. For example, in one embodiment of U.S. Pat. No. 5,234,777, an ink is prepared by dispersing Pt supported on carbon (Pt/C) in an alcoholic solution of the ionomer binder. The ink is then applied to a polytetrafluoroethylene (PTFE) blank substrate, dried, and finally laminated on either side of the PEM by a hot-pressing step. Due to this hot-pressing step, dense and pore-free catalyst layers are formed, causing limited access to the active sites by the reaction gases. This has a detrimental effect on the electrochemical performance of the PEMFC.

In EP 0797 265, an ink is prepared by dispersing Pt/C in an alcoholic solution of the ionomer binder and a pore-producer agent is added to the ink. The prepared catalyst layers have high porosity leading to an electrochemical performance improvement of the PEMFC. However, the addition of pore-producer agent leads to the contamination of the catalyst layer and additional steps are necessary to remove the pore-producer agent from the MEA catalyst layers.

U.S. Pat. No. 7,419,740 discloses the use of MEAs having increased activity and improved utilization of the noble metal catalyst. In one embodiment, the cathode catalyst layer is comprised of at least two sub-layers on top of each other. The first sub-layer is adjacent to the PEM comprised of a mixture of noble metal black and noble metal supported on carbon, while the second cathode sub-layer is comprised of another noble metal catalyst supported on carbon. These MEAs have the disadvantage that the presence of the noble metal black in the catalyst layer (CL) tends to create denser catalyst layers. These denser catalyst layers lead to reactant gas diffusion and water management issues due to their lower porosity.

Most MEAs are comprised only of CCMs containing a cathode catalyst layer with a single homogeneous layer structure and symmetrical GDM pairings. These MEAs have limited power production in hot and dry conditions. The consensus was that additional catalyst layers in the MEA structure would be undesirable because of increased interfacial resistance and processing steps. Also, the consensus in the prior art was that highly porous and thin cathode GDM were preferred for high power operation because of shorter diffusion path.

U.S. Pat. No. 10,205,173 discloses the use of an MEA having improved performance and durability. In one embodiment, the cathode catalyst layer is comprised of at least two sub-layers on top of each other. The first sub-layer adjacent to the PEM is comprised of mixture of a first catalyst supported on a first carbonaceous support and a second catalyst supported on a second carbonaceous support. The second cathode sub-layer is comprised of a third catalyst supported on a third carbonaceous support. The first carbonaceous support is described as carbon black and the second and third carbonaceous supports are described as partially graphitized. This patent does not address the issue of enhanced power production at high temperature and low relative humidity (RH) that is needed for unmanned aerial vehicle (UAV) applications. It also does not teach different volume ratio of catalyst layers nor anode- and cathode-specific GDM selection.

BRIEF SUMMARY

Disclosed herein is an article comprising: a proton exchange membrane, an anode catalyst coating on a first side of the membrane, and a cathode catalyst coating on a second side of the membrane. The cathode catalyst coating comprises at least two layers, each layer comprising a carbon catalyst. At least one of the layers is a low porosity layer, and at least one of the layers is a high porosity layer adjacent to one of the low porosity layers. The average porosity of all of the carbon catalyst in the high porosity layer is higher than the average porosity of all of the carbon catalyst in the low porosity layer. The high porosity layers have a volume fraction of the cathode catalyst coating that is higher than the volume fraction of the low porosity layers.

Also disclosed herein is a method comprising: providing a proton exchange membrane, applying an anode catalyst coating to a first side of the membrane, and applying a cathode catalyst coating to a second side of the membrane. Applying the cathode catalyst coating comprises: applying at least one low porosity layer comprising a low porosity carbon catalyst, and applying at least one high porosity layer comprising a high porosity carbon catalyst before or after applying the low porosity layer. At least one of the high porosity layers is adjacent to at least one of the low porosity layers. The average porosity of all of the carbon catalyst in the high porosity layer is higher than the average porosity of all of the carbon catalyst in the low porosity layer. The high porosity layers have a volume fraction of the cathode catalyst coating that is higher than the volume fraction of the low porosity layers.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The MEA disclosed herein addresses a need for improving fuel cell performance at low RH. Obviating the need for a humidifier is a path to further miniaturize and simplify the fuel cell stack, to maximize its power-to-weight and volumetric energy density.

It has been observed that catalyst layers prepared by ultrasonic spray deposition (USD) have unique behavior and structures. Previous work indicates that increasing microporosity in the cathode catalyst layer increases power production (Garsany et al., *J. Electrochem. Soc.*, 165 (2018) F381-F391; Garsany et al., *J. Power Sources*, 408 (2018) 38-45). Modeling work supports that increasing catalyst microporosity enhances water evaporation, which reduces mass transport resistances to enable higher power production (Eikerling, *J. Electrochem. Soc.*, 153 (2006) E58-E70). It has been observed that catalyst layers deposited using the USD methodology vary in microporosity as a function of number of sequentially deposited layers/coatings (Sassin et al., *Int. J. Hydrogen Energy*, 44 (2019) 16944-16955). A subsequently sprayed layer of catalyst ink may modify the dried catalyst layer beneath it. Careful attention to CCM preparation by materials selection and ambient conditions would allow better control of the CL structure. This enables CL structures with enhanced water management properties.

Figure 3:
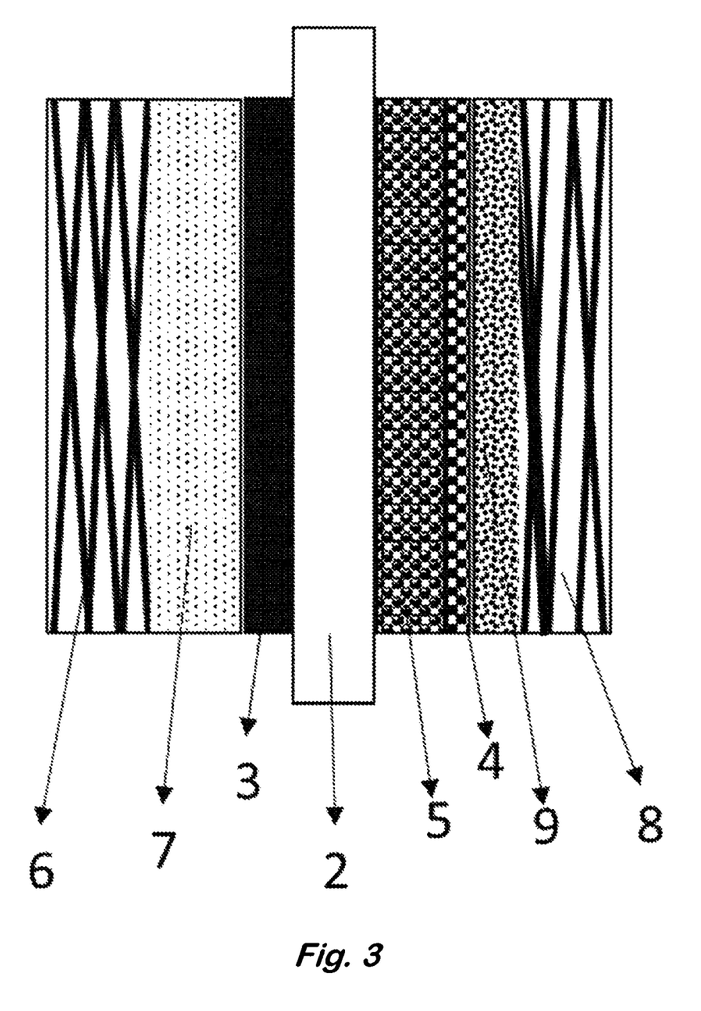
FIG. 3 shows a second embodiment of an MEA with two cathode catalyst layers.
Figure 4:
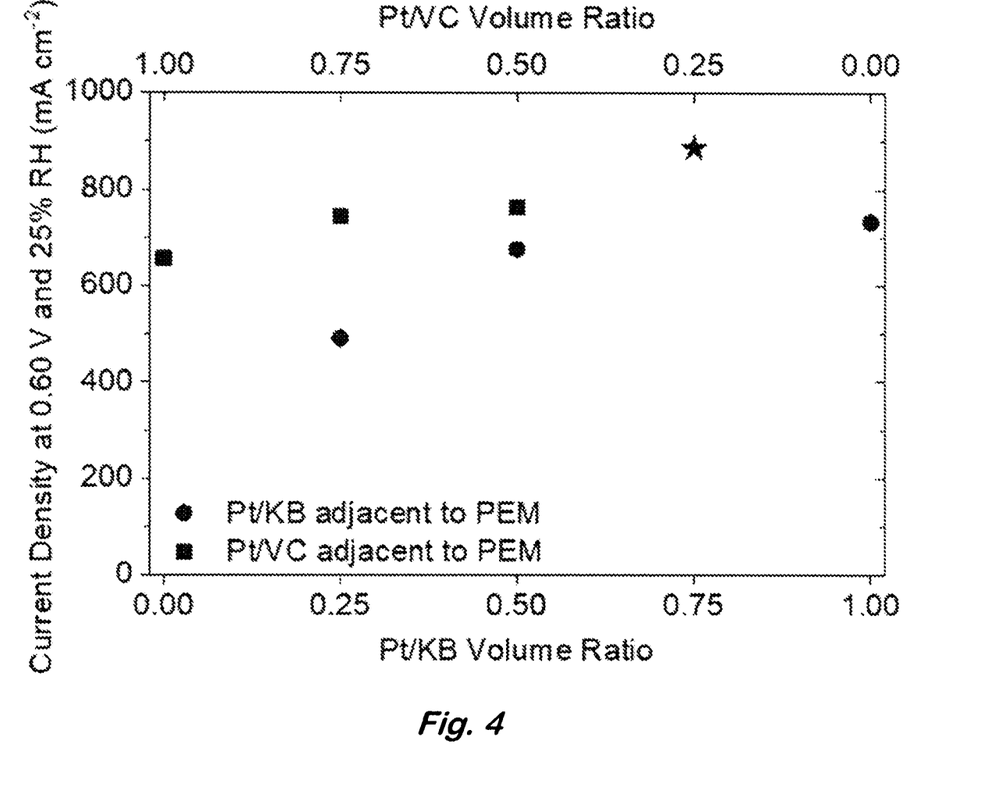
FIG. 4 shows current density measured at 0.60 V and 25% inlet RH as function of Pt/KB and Pt/VC volume ratio in the double-layer cathode catalyst layers (non-binary volume ratios) and the standards (binary volume ratios).

FIGS. 3 and 4 show the structure of two embodiments. In these embodiments MEA has 2 cathode catalyst layers 4, 5 with a buried interface with volume ratios of 25% and 75%. The proton exchange membrane 2 is coated on one side with the anode catalyst layer 3. A Pt/C supported catalyst is commonly used as the anode catalyst. The anode noble metal loading may range from 0.05 $mg_{Pt}$ $cm^{-2}$ to 0.15 $mg_{Pt}$ $cm^{-2}$. The anode catalyst layer 3 also contains an ionomer binder such as Nafion®. The ionomer binder content in the anode catalyst layer may be 20-50 wt. %, including about 27 wt. %. Suitable binder types also include Aquivion® and Aciplex®. The other side of the proton exchange membrane 3 is coated with two cathode catalyst layers 4, 5 with a buried interface with volume ratios of 25% and 75%. One cathode catalyst layer 5 may consist of a higher microporosity catalyst like Ketjenblack and the other 4 a lower microporosity catalyst like Vulcan carbon.

The orientation of the cathode catalyst layers 4, 5 relative to the membrane 2 is not critical, but the volume ratio may feature a 75% volume ratio of the higher microporosity catalyst 5 and a 25% volume ratio of the lower microporosity catalyst 4. FIGS. 3 and 4 depict the two orientations. The suitable formulations of the catalyst are 40 wt. % Pt/Ketjenblack and 40 wt. % Pt/Vulcan carbon, but the range may be 20-70 wt. % and may use Pt-alloy (Co, Ni, etc.) compositions known to those skilled in the art. Both cathode catalyst layers 4, 5 contain an ionomer binder such as Aquivion®. The ionomer binder content in each of the cathode catalyst layer may be 20-50 wt. %, including about 27 wt. %. Suitable binder types also include Aquivion® and Aciplex®. The GDM combination should feature a GDM 6, 7 at the anode that more effectively retains water and a GDM 8, 9 at the cathode that is highly effective at removing water from the cathode. This may be realized by using an anode GDM comprised of a non-woven GDL 6 that has a hydrophobic treatment and with an MPL 7 that is thicker, more permeable, more homogeneous in through-plane tortuosity distribution, more thermally conductive, and comprised of carbon that is more graphitic in nature relative to the cathode GDM.

The cathode GDM may be comprised of a non-woven GDL 8 without hydrophobic treatment and should have an MPL 9 that, when compared to that at the anode, is thinner, is less permeable, has a higher content of hydrophobic agent (i.e. polytetrafluoroethylene, PTFE), is less graphitic in nature, less thermally conductive, has more spherical void volumes, and has a more broad distribution of through-plane tortuosity. The anode GDM may be Freudenberg H24C3 and the cathode GDM may be Freudenberg H23C2 but alternative, asymmetric GDM pairings, GDM with alternative GDL types (woven, felt, wet-laid, etc.), GDM with alternative MPL carbon types (graphitic, carbon nanotubes, etc.), and GDM with MPL of alternative hydrophobic content (1-60% PTFE) may be used.

Each distinct layer of the CCM may have different properties. This can include the inherent porosity of the Pt catalyst carbon support (Vulcan vs. Ketjenblack), microporosity variation induced by ionomer selection in the cathode catalyst layer (Nafion® vs. Aquivion®), and microporosity gradient from layer-to-layer that is engendered by the USD method. The orientation of these layers relative to the membrane is not critical, but the volume ratio may feature a 70%, 75%, or 80% volume ratio of the higher microporosity catalyst and a 20%, 25%, or 30% volume ratio of the lower microporosity catalyst as depicted in FIGS. 5A-F.

Double-layered cathode catalyst layer CCMs may be manufactured by using two types of platinum catalyst supported on carbon black. One catalyst may be a Vulcan carbon (e.g., pore volume<about 200 mL/100 g) supported Pt catalyst (Pt/VC, 40 wt. % Pt, Pt particle size≤4.5 nm), and the second catalyst may be a Ketjenblack EC-300J (pore volume>300 mL/100 g, e.g., 310-345 mL/100 g) supported Pt catalyst (40 wt. % Pt, Pt particle size≤2.5 nm).

Aquivion® may be used as the ionomeric binder in the double-layered cathode CCMs because it has a lower equivalent mass than the Nafion® ionomer binder. There are more hydrophilic groups present for the same mass, which gives it a stronger hydrophilic character. This property enhances proton conductivity especially at low relative humidity due to a larger number of sulfonated sites.

Dual-layered catalyst layers realize their advantage over the previous state-of-the-art by the characteristics of the carbon support. Ketjenblack based CLs possess a better water-retaining capability and perform better at lower relative humidity than Vulcan carbon based CLs.

Each electrode plays a role in global cell water management and the anode- and cathode-specific GDM selections can improve water management to enable higher power. Symmetric GDM pairings, with the same GDM at anode and cathode, have insufficient water management, saturate the cathode with liquid water at lower current densities, and result in less power production from the PEMFC. The asymmetric GDMs can facilitate water removal from the cathode compared to symmetric GDM pairings, and that advances the capability of the catalyst layers. The asymmetric GDM combination reduces the liquid water saturation in the cathode that facilitates oxygen diffusion compared to a symmetric GDM.

In concert with the dual-layer CCMs described above, the result is overall enhanced water management. By using dual-layer CCMs, the PEMFC realizes lower ohmic resistance, enhanced proton conductivity, and lower oxygen transport resistance compared to the standard CCMs.

Other catalysts may be used for the double-layered cathode catalyst layer such as Pt or Pt alloys supported on high surface area carbon black, such as acetylene black or BLACK PEARLS® 2000, but not limited to these choices. Any two types of electrocatalyst that vary in properties, such as porosity or hydrophobicity, may be used. The double-layered cathode catalyst layers could be deposited on different types of proton exchange membranes such as Flemion® (Asahi Glass, Japan), Aquivion® (Solvay Plastics), or GORE-SELECT® (W.L. Gore & Associates). Different types of proton conducting ionomer binder may be used in the catalyst layers such as Nafion® (Dupont) or Aciplex® (Asahi Kasei Corporation, Japan). Different asymmetric GDM combinations could be used such as Freudenberg H23C3 on the anode side and Freudenberg H23C8 (Freudenberg FCCT SE & Co, Germany) on the cathode. Additionally, GDM from other manufacturers including but not limited to AvCarb®, SGL®, MRC, or Toray may be used if the properties of the anode and cathode are distinct to favor water removal from the cathode and water retention in the anode. Alternative, asymmetric GDM pairings may be used that may be formed using GDM with alternative GDL types (woven, felt, wet-laid, etc.), GDM with alternative MPL carbon types (graphitic, carbon nanotubes, etc.), and GDM with MPL of alternative hydrophobic content (1-60% PTFE) known to those skilled in the art. The double-layered cathode catalyst layer CCMs could be prepared by other deposition methods such as doctor blade, screen printing, ink jet printing, or roll to roll process.

At a minimum, the disclosed article comprises the proton exchange membrane, the anode catalyst coating on a first side of the membrane, and the cathode catalyst coating on a second side of the membrane, opposite to the anode catalyst. The cathode catalyst has at least two layers, each layer having a carbon catalyst. At least one of the layers is a low porosity layer and at least one of the layers is a high porosity layer. These two layers use different carbon catalysts, or combinations thereof, so that the average porosity of all of the carbon catalyst in the high porosity layer is higher than the average porosity of all of the carbon catalyst in the low porosity layer. Porosity may refer to pore size or to total pore volume per mass of carbon. None of the carbon catalyst in these layers is ignored when making this calculation. Thus, the high and low porosity layers may each use a single catalyst of different porosity than the other, such as two different carbon blacks. Alternatively, the two layers may use blends of catalysts, where the average porosity of the blends is different between the two layers, even if the same catalysts are used in both blends. The average pore size of all of the carbon catalyst in the high porosity layer may be at least 50 nm, and the average porosity of all of the carbon catalyst in the low porosity layer may be at most 30 nm. The porosity of the layers may also be influenced by factors other than the carbon catalyst porosity, such as the choice of ionomer and method of application.

More than one of either the high porosity layer or the low porosity layer or both may be present as long as there is at least one of each. Other layers of materials may be present between the various layers of catalysts, membrane, and GDM, as long as at least one high porosity layer is in direct contact with at least one low porosity layer.

There is a higher volume fraction of the total of all high porosity layers than the total of all low porosity layers. The volume fraction is calculated by dividing the total volume of all high (or low) porosity layers by the total volume of all high and low porosity layers. From 70-80%, including, 71, 72, 73, 74, 75, 76, 77, 78, and 79% may be high porosity layers, with the balance being low porosity layers.

The cathode or anode catalyst layers may be made by ultrasonic spray deposition. This technique is described in Sassin et al., "Fabrication Method for Laboratory-Scale High-Performance Membrane Electrode Assemblies for Fuel Cells" *Anal. Chem.* 2017, 89, 511-518.

The disclosed article may also include an anode gas diffusion medium on the anode catalyst coating opposed to the membrane and a cathode gas diffusion medium on the cathode catalyst coating opposed to the membrane. As explained above the anode gas diffusion medium may have a higher water retention rate than the cathode gas diffusion medium.

A fuel cell may include this MEA. Configurations for including a MEA into a fuel cell are known in the art. It may be operated by connecting an electrical load to the anode gas diffusion medium and the cathode gas diffusion medium, supplying hydrogen to the anode catalyst coating, providing oxygen to the cathode catalyst coating, and allowing an electrical current to flow from the anode gas diffusion medium, through the electrical load, and to the cathode gas diffusion medium.

The following examples are given to illustrate specific applications. These specific examples are not intended to limit the scope of the disclosure in this application.

Figure 5A:
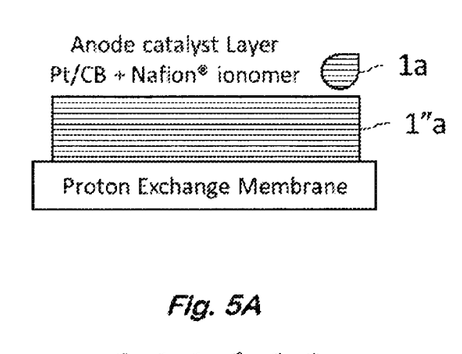
FIGS. 5A-F show a preparation process of a first type of double-layered cathode catalyst layer (CCM #1).
Figure 5B:
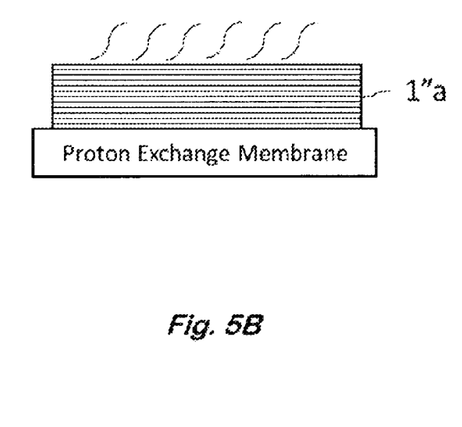

In a first set of double-layered cathode CCMs, CCM #1, a first catalyst ink (1a) containing a solvent, a platinum supported on carbon black (Pt/CB) catalyst and Nafion® ionomer binder were prepared. This first catalyst ink (1a) was then deposited onto a proton exchange membrane to form the anode catalyst layer (1″a) using an ultrasonic spray coater (FIG. 5A). Subsequently, the formed anode catalyst layer (1″a) was allowed to dry overnight at room temperature (FIG. 5B).

Figure 5C:
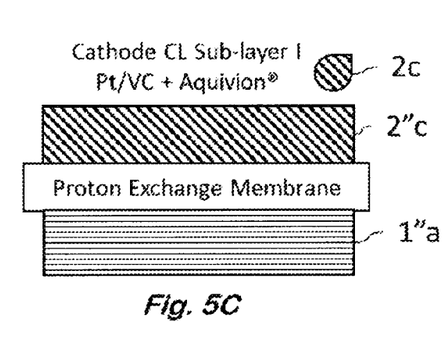
Figure 5D:
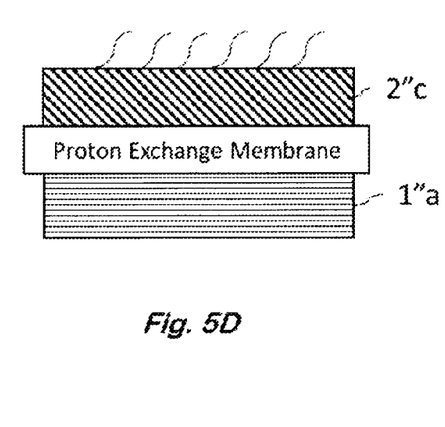
Figure 5E:
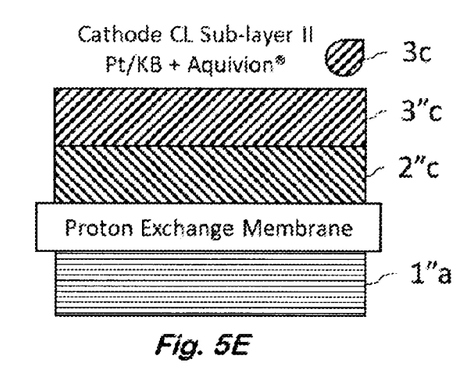
Figure 5F:
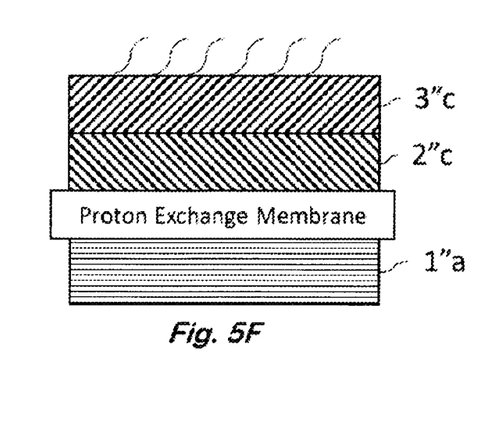

Next, a second catalyst ink (2c) containing a solvent, a Pt/VC catalyst and Aquivion® binder was prepared. The second catalyst ink (2c) was then deposited on the other side of the proton exchange membrane to form the first cathode catalyst layer, Sub-layer I (2″c), using an ultrasonic spray coater (FIG. 5C). Subsequently, Sub-layer I (2″c) was allowed to dry overnight at room temperature (FIG. 5D). The thickness of Sub-layer I (2″c) was ~3 μm. Next, a third catalyst ink (3c) containing a solvent, a Pt/KB catalyst and Aquivion® binder was prepared. The third catalyst ink (3c) was then deposited on the top of the first cathode catalyst layer, Sub-layer I (2″c), to form the second cathode catalyst layer, Sub-layer II (3″c), using an ultrasonic spray coater (FIG. 5E). Subsequently, the formed second cathode catalyst layer Sub-layer II (3″c) was allowed to dry overnight at room temperature (FIG. 5F). The thickness of the second cathode catalyst layer Sub-layer II (3″c) was ~9 μm.

Figure 6:
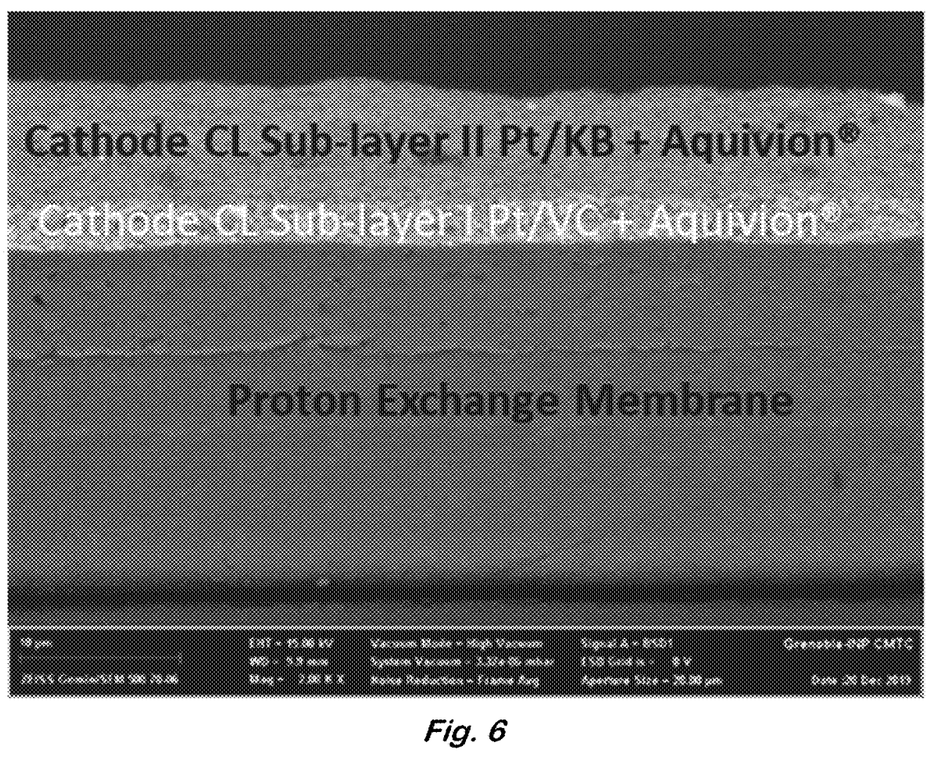
FIG. 6 shows an SEM micrograph of the first set of double-layered cathode catalyst layers (CCM #1).
Figure 7:
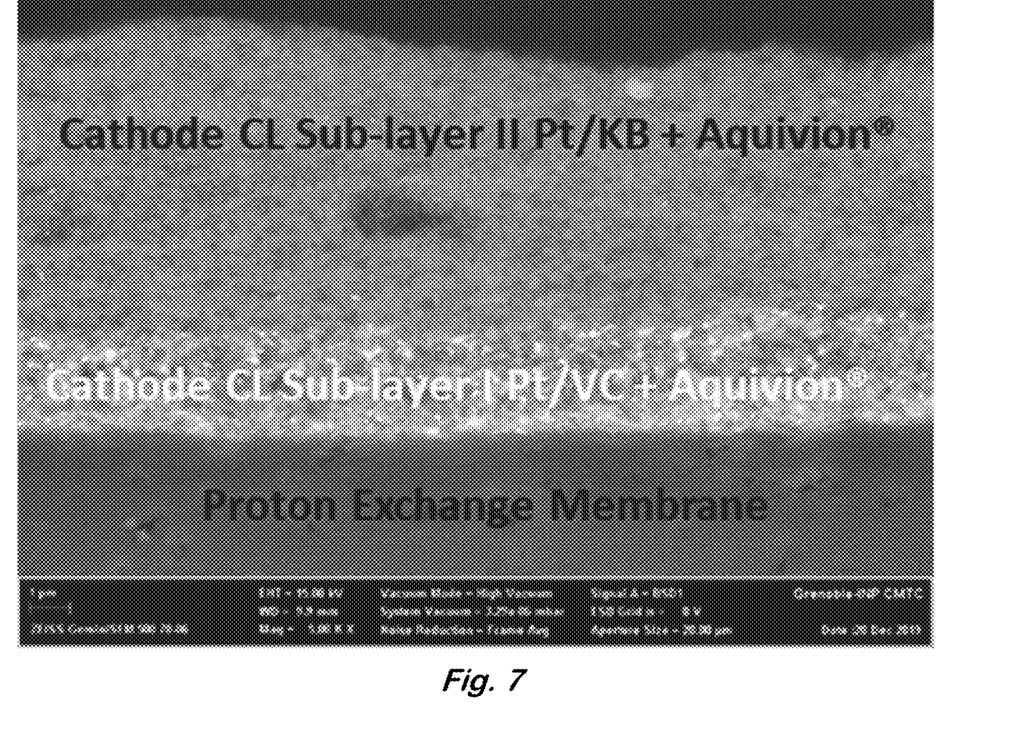
FIG. 7 shows an SEM micrograph of the first set of double-layered cathode catalyst layers (CCM #1).

FIGS. 6 and 7 present SEM micrographs at two magnifications of the double-layered cathode CCM #1 described above and that are shown schematically in FIG. 5F.

Figures 8A, 8C:
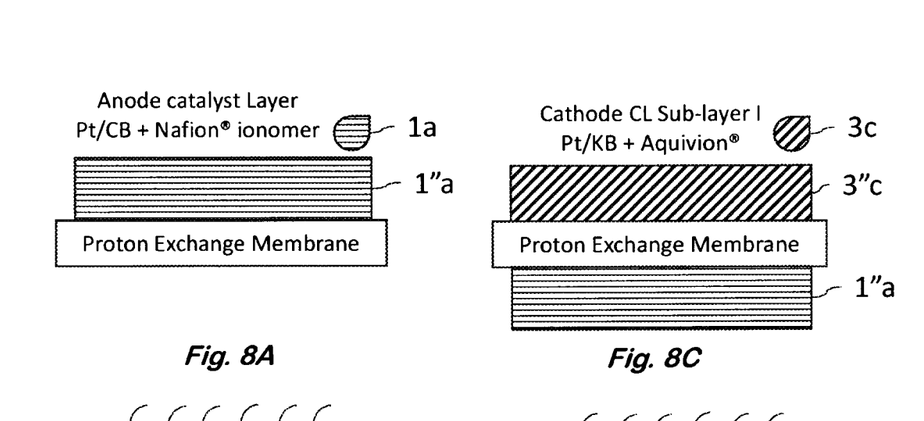
FIGS. 8A-F shows a preparation process of a second type of double-layered cathode catalyst layer (CCM #2).
Figures 8B, 8D:
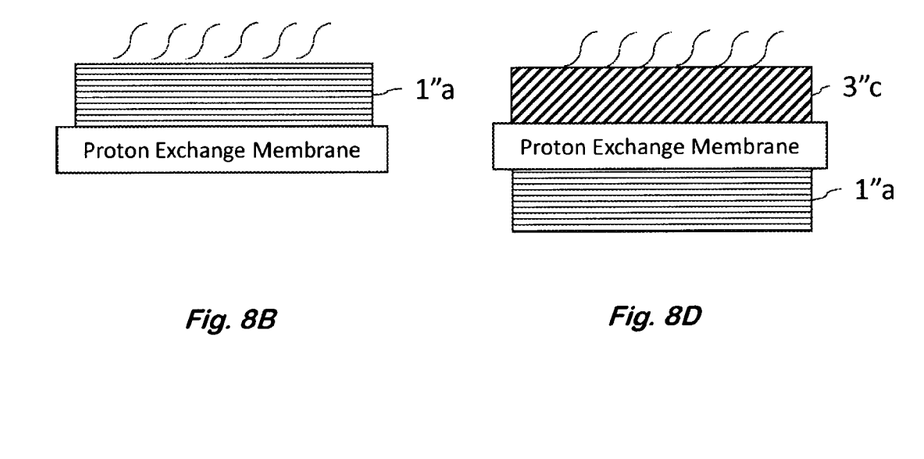
Figure 8E:
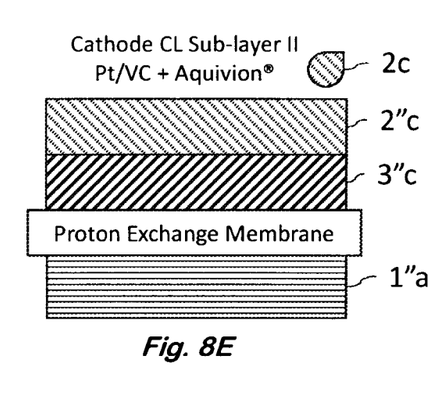
Figure 8F:
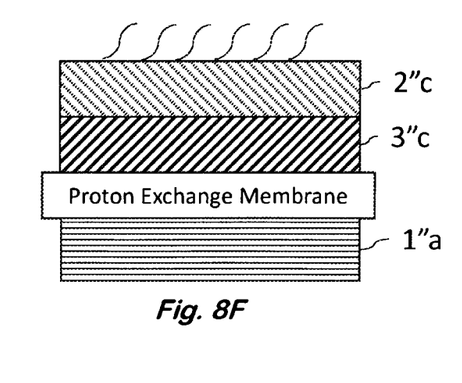

In a second set of double-layered cathode CCM, CCM #2, a first catalyst ink (1a) containing a solvent, a Pt/CB catalyst, and Nafion® ionomer binder was prepared. This first catalyst ink (1a) was then deposited onto a proton exchange membrane to form the anode catalyst layer (1″a) using an ultrasonic spray coater (FIG. 8A). Subsequently, the formed anode catalyst layer (1″a) was allowed to dry overnight at room temperature (FIG. 8B). Next, the third catalyst ink (3c) containing a solvent, a Pt/KB catalyst and Aquivion® binder was prepared. The third catalyst ink (3c) was then deposited on the other side of the proton exchange membrane to form the first cathode catalyst layer, Sub-layer I (3″c), using an ultrasonic spray coater (FIG. 8C). Subsequently, Sub-layer I (3″c) was allowed to dry overnight at room temperature (FIG. 8D). The thickness of the first cathode catalyst layer Sub-layer I (2″c) is ~9 μm. Next, the second catalyst ink (2c) containing a solvent, a Pt/KB catalyst and Aquivion® binder was prepared. The second catalyst ink (2c) was then deposited on the top of Sub-layer I (3″c) to form the second cathode catalyst layer, Sub-layer II (2″c), using an ultrasonic spray coater (FIG. 8E). Subsequently, Sub-layer II (2″c) was allowed to dry overnight at room temperature (FIG. 8F). The thickness of the second cathode catalyst layer Sub-layer II (3″c) was ~3 μm.

Figure 9:
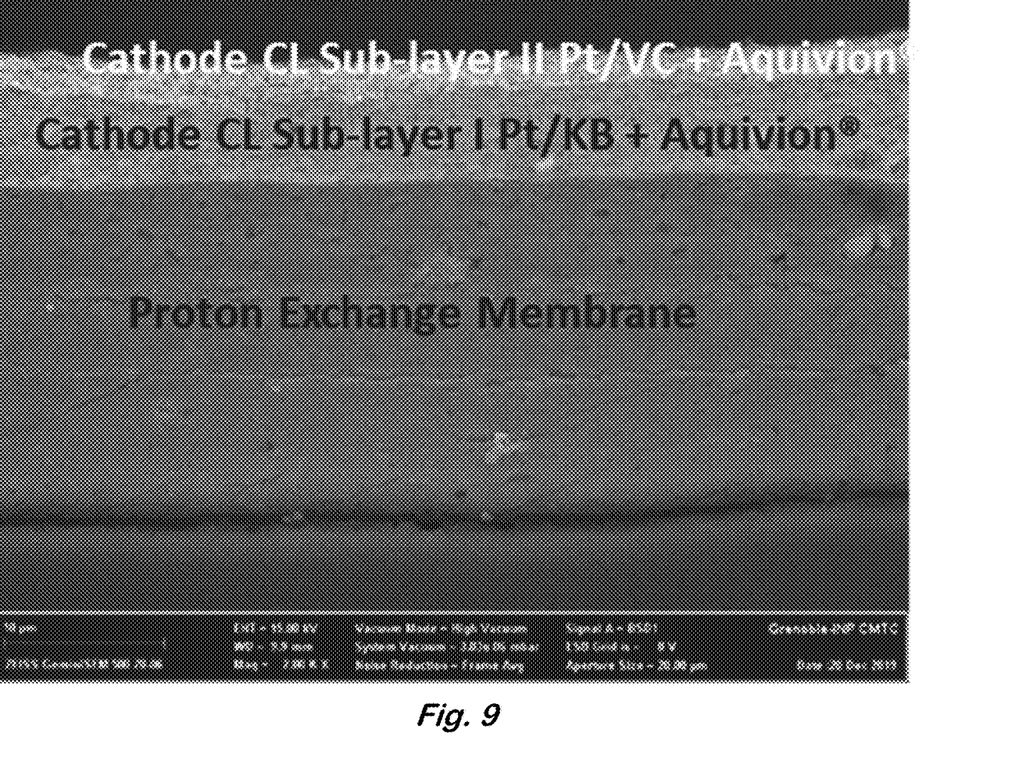
FIG. 9 shows an SEM micrograph of the second set of double-layered cathode catalyst layers (CCM #2).
Figure 10:
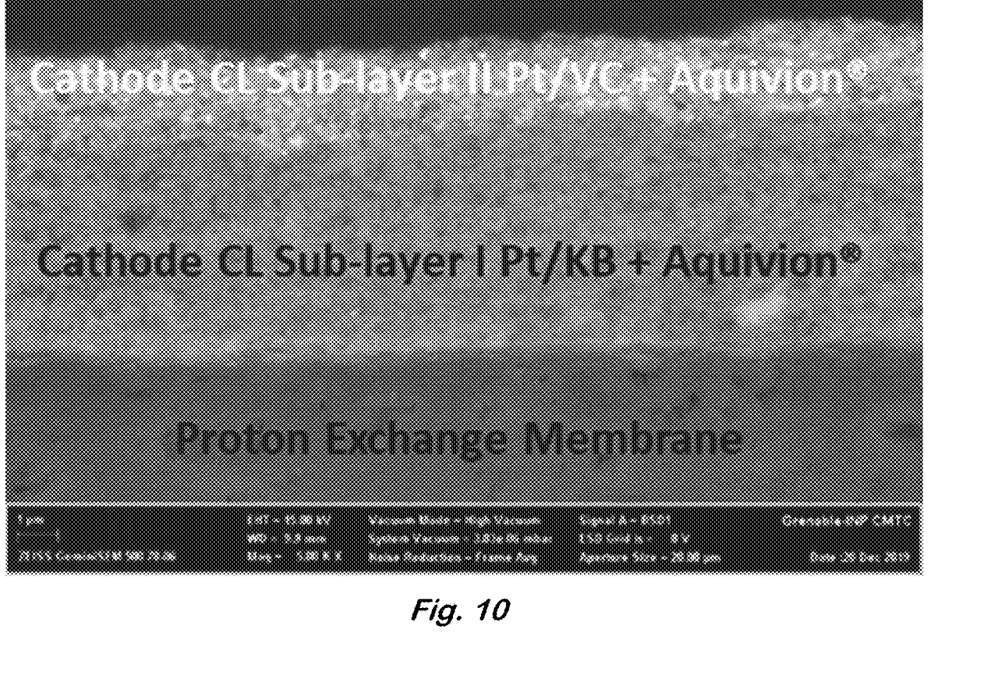
FIG. 10 shows an SEM micrograph of the second set of double-layered cathode catalyst layers (CCM #2).

FIGS. 9 and 10 present SEM micrographs at two magnifications of the double-layered cathode CCM (CCM #2) that is described above and shown schematically in FIG. 8F.

The manufacturing protocol of a CCM containing a single-layered cathode catalyst layer (a "Standard") is the same as above. The only difference is the cathode catalyst layer manufacturing. A Standard was made of a single layer of the Pt/KB+ Aquivion® (3″c) or a single layer of the Pt/VC+ Aquivion® (2″c). The thickness of the single-layered cathode catalyst layer may range from 8 to 11 μm, depending on the catalyst type used.

Figure 11:
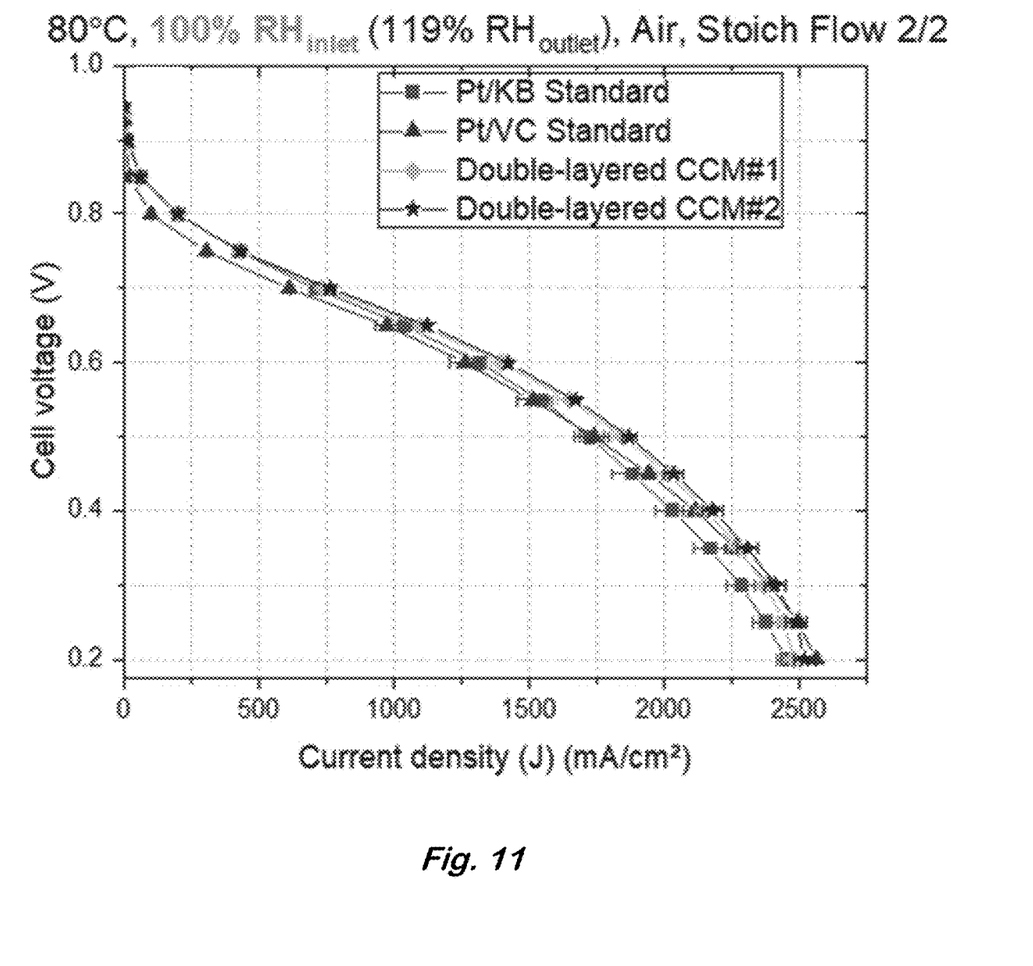
FIG. 11 shows average current densities vs. cell voltage curves obtained for the standard CCMs and the double-layered cathode CCMs at a cell temperature of 80° C. and ambient pressure at 100% inlet RH.
Figure 12:
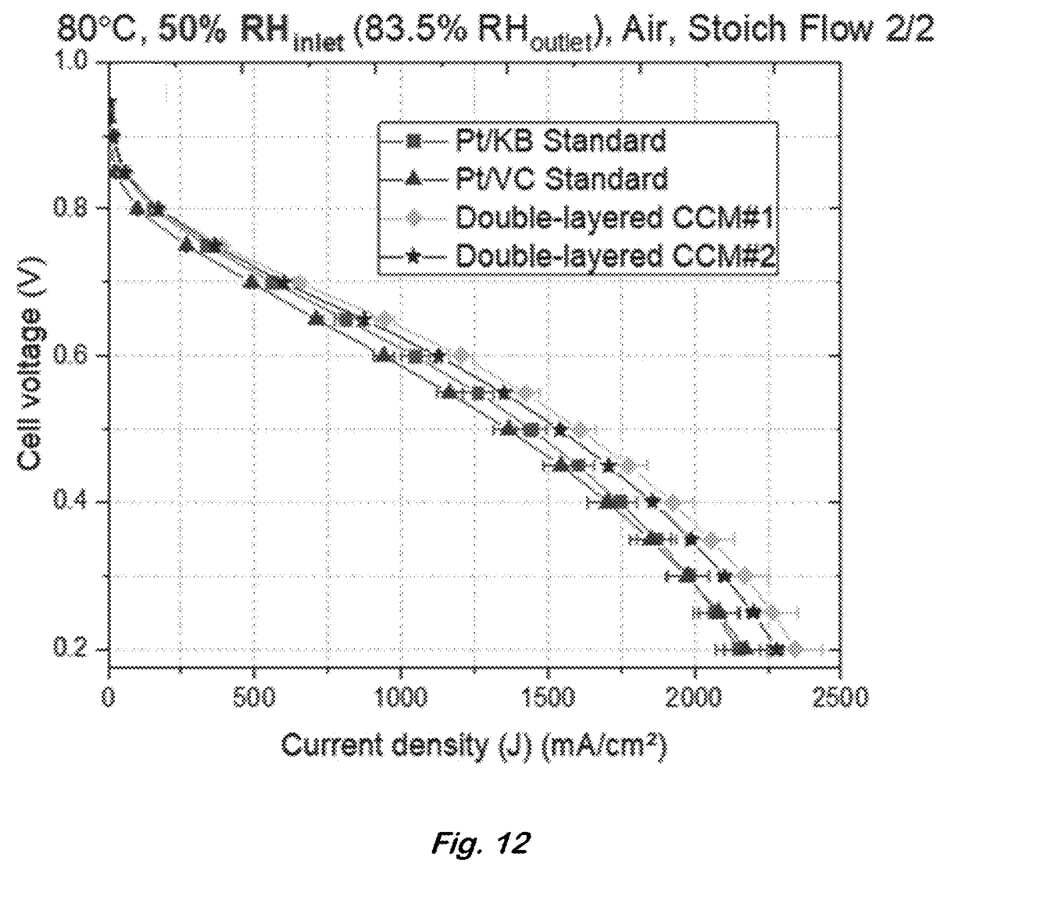
FIG. 12 shows average current densities vs. cell voltage curves obtained for the standard CCMs and the double-layered cathode CCMs at a cell temperature of 80° C. and ambient pressure at 50% inlet RH.
Figure 13:
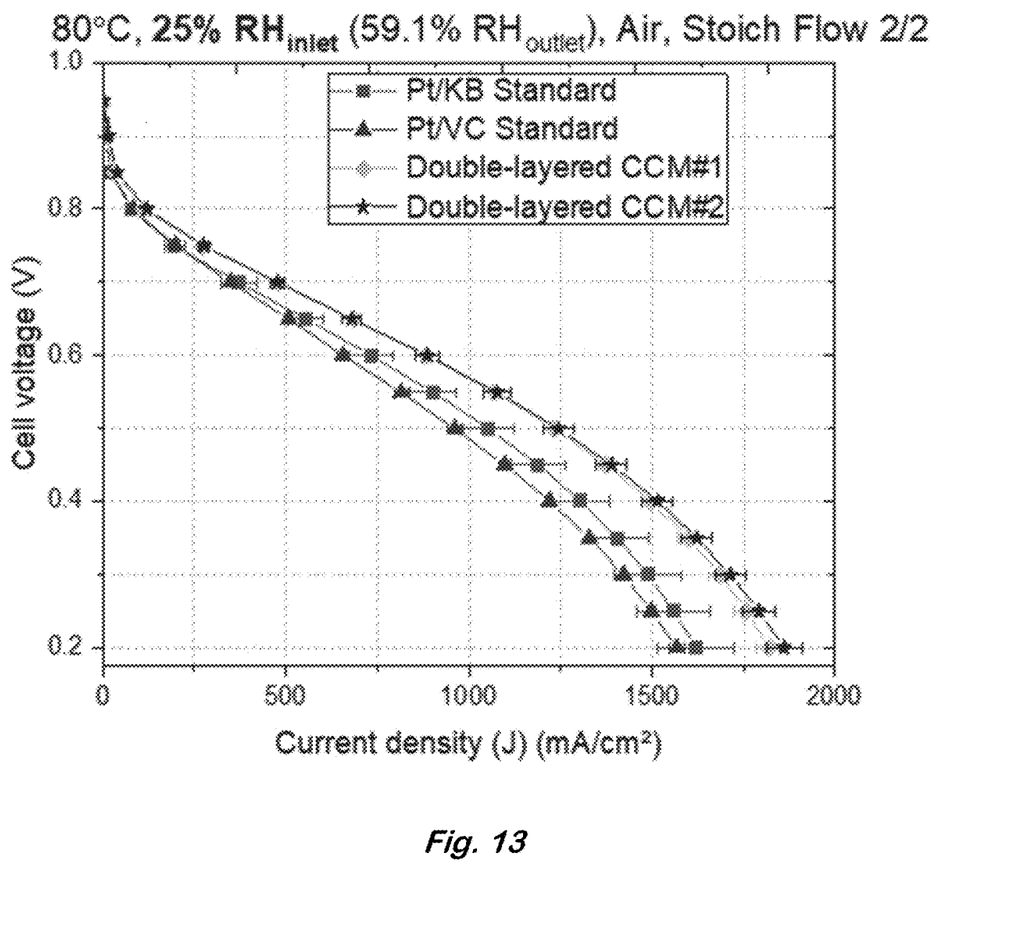
FIG. 13 shows average current densities vs. cell voltage curves obtained for the standard CCMs and the double-layered cathode CCMs at a cell temperature of 80° C. and ambient pressure at 25% RH.

The performance of the MEAs was studied in conditions close to those recommended for a UAV. All the tests were conducted at 80° C. and ambient pressure (1 atm) under stoichiometric flow rate of 2/2 (Hz/air). The inlet relative humidity of the gases varied from 25% to 100%. The test started with a measurement of the cell open circuit voltage (OCV). The voltage vs. current curves representative of the cell performance was recorded at increments of 25 mV from OCV to 0.40 V with hold times of 1 min/point. The results are shown in FIGS. 11-13. At all cell operating conditions, the double-layered CCM #1 and CCM #2 outperformed the single-layered Pt/KB standard or Pt/VC standard MEAs.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. An article comprising:
   a proton exchange membrane;
   an anode catalyst coating on a first side of the membrane; and
   a cathode catalyst coating on a second side of the membrane;
      wherein the cathode catalyst coating comprises at least two layers, each layer comprising a carbon catalyst;
      wherein at least one of the layers is a low porosity layer;
      wherein at least one of the layers is a high porosity layer adjacent to one of the low porosity layers;
      wherein the average porosity of all of the carbon catalyst in the high porosity layer is higher than the average porosity of all of the carbon catalyst in the low porosity layer; and wherein the high porosity layers have a volume fraction of the cathode catalyst coating of 70-80 vol. %, with the balance being the low porosity layers.

2. The article of claim 1, wherein the high porosity layer or the low porosity layer is made by ultrasonic spray deposition.

3. The article of claim 1, wherein the high porosity layer is between the proton exchange membrane and the low porosity layer.

4. The article of claim 1, wherein the low porosity layer is between the proton exchange membrane and the high porosity layer.

5. The article of claim 1, wherein each of the carbon catalysts is a carbon black.

6. The article of claim 5;
wherein the average pore size of all of the carbon catalyst in the high porosity layer is at least 50 nm; and
wherein the average pore size of all of the carbon catalyst in the low porosity layer is at most 30 nm.

7. The article of claim 1, further comprising:
an anode gas diffusion medium on the anode catalyst coating opposed to the membrane; and
a cathode gas diffusion medium on the cathode catalyst coating opposed to the membrane.

8. A fuel cell comprising the article of claim 7.

9. A method comprising:
providing the fuel cell of claim 8;
connecting an electrical load to the anode gas diffusion medium and the cathode gas diffusion medium;
supplying hydrogen to the anode catalyst coating;
providing oxygen to the cathode catalyst coating; and
allowing an electrical current to flow from the anode gas diffusion medium, through the electrical load, and to the cathode gas diffusion medium.

10. The method of claim 9, wherein the anode gas diffusion medium has a higher water retention rate than the cathode gas diffusion medium.

11. The article of claim 7, wherein the anode gas diffusion medium has a higher water retention rate than the cathode gas diffusion medium.

12. A method comprising:
providing a proton exchange membrane;
applying an anode catalyst coating to a first side of the membrane;
applying a cathode catalyst coating to a second side of the membrane;
wherein applying the cathode catalyst coating comprises:
applying at least one low porosity layer comprising a low porosity carbon catalyst; and
applying at least one high porosity layer comprising a high porosity carbon catalyst before or after applying the low porosity layer;
wherein at least one of the high porosity layers is adjacent to at least one of the low porosity layers;
wherein the average porosity of all of the carbon catalyst in the high porosity layer is higher than the average porosity of all of the carbon catalyst in the low porosity layer; and
wherein the high porosity layers have a volume fraction of the cathode catalyst coating of 70-80 vol. %, with the balance being the low porosity layers.

13. The method of claim 12, wherein the high porosity layer or the low porosity layer is made by ultrasonic spray deposition.

14. The method of claim 12, wherein applying the cathode catalyst coating comprises:
applying the high porosity layer directly onto the membrane; and
applying the low porosity layer directly onto the high porosity layer.

15. The method of claim 12, wherein applying the cathode catalyst coating comprises:
applying the low porosity layer directly onto the membrane; and
applying the high porosity layer directly onto the low porosity layer.

16. The method of claim 12, further comprising:
applying an anode gas diffusion medium to the anode catalyst coating opposed to the membrane; and
applying a cathode gas diffusion medium to the cathode catalyst coating opposed to the membrane.

17. The method of claim 16, wherein the anode gas diffusion medium has a higher water retention rate than the cathode gas diffusion medium.

* * * * *